(12) United States Patent
Kirchhof et al.

(10) Patent No.: US 7,966,102 B2
(45) Date of Patent: Jun. 21, 2011

(54) METHOD AND SYSTEM FOR POWER PLANT BLOCK LOADING

(75) Inventors: Darrin Glen Kirchhof, Schenectady, NY (US); Bryan Edward Sweet, Valatie, NY (US); Karl Dean Minto, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 174 days.

(21) Appl. No.: 11/927,883

(22) Filed: Oct. 30, 2007

(65) Prior Publication Data
US 2009/0112374 A1    Apr. 30, 2009

(51) Int. Cl.
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| F02C 1/00 | (2006.01) |
| F02C 6/00 | (2006.01) |

(52) U.S. Cl. .......... 700/287; 700/286; 700/288; 60/772; 60/39.182

(58) Field of Classification Search .................. 700/287, 700/286, 288; 60/772, 39.182
See application file for complete search history.

(56) References Cited

U.S. PATENT DOCUMENTS

| 4,103,178 A * | 7/1978 | Yannone et al. ............ 290/40 R |
| 4,258,424 A * | 3/1981 | Giras et al. ..................... 700/290 |
| 4,455,614 A * | 6/1984 | Martz et al. ................... 700/288 |
| 2003/0010037 A1* | 1/2003 | Vugdelija ........................ 60/772 |
| 2004/0158360 A1* | 8/2004 | Garland et al. ............... 700/286 |
| 2005/0087496 A1* | 4/2005 | Borseth ......................... 210/717 |
| 2006/0032232 A1* | 2/2006 | Takai et al. ...................... 60/772 |
| 2006/0132103 A1* | 6/2006 | Baratto et al. .................. 322/17 |
| 2007/0091623 A1* | 4/2007 | Walters et al. ................ 362/458 |
| 2007/0130952 A1* | 6/2007 | Copen ............................. 60/772 |
| 2008/0071427 A1* | 3/2008 | Szepek et al. ................. 700/287 |

* cited by examiner

*Primary Examiner* — Ramesh B Patel
*Assistant Examiner* — Jason Lin
(74) *Attorney, Agent, or Firm* — Dale J. Davis; Ernest G. Cusick; Frank A. Landgraff

(57) ABSTRACT

Block loading may occur during the process of restoring an electrical grid after a blackout. A method and system for coordinating the loading of a combined cycle power plant to support block loading is provided. The power plant may include a gas turbine and a steam turbine. The method and system may provide load control loops, for the gas and steam turbine, which support block loading.

20 Claims, 5 Drawing Sheets

US 7,966,102 B2

METHOD AND SYSTEM FOR POWER PLANT BLOCK LOADING

BACKGROUND OF THE INVENTION

The present invention relates generally to power plant block loading and, more particularly, to a method and system for coordinating block loading of a combined-cycle power plant.

Block loading is a method of loading a power plant after a partial or complete electrical blackout of the electrical grid (hereinafter "grid"). Here, the normal process of loading the power plant is not possible. When a grid is de-energized or broken up into isolated sections, the active generating unit must provide the frequency/speed control. A strategy of reconnecting load in small amounts or "blocks" may be employed to ensure that the operational limits of the power plant are not exceeded. The sudden reconnection of a large block of load to the grid may drag down the system frequency or cause the active generating unit to exceed operational limits and trip off-line.

An electrical power system generally consists of a grid, electrical loads, transmission lines, and power generating equipment, such as, but not limiting of, gas and steam turbines. In an electrical power system the amount of electrical load should be balanced by an equal amount of electrical generation. Any change in load should be matched by an equal change in generation. As a protective measure, all electrical loads and generating equipment are isolated from the transmission system after an electrical blackout. Reestablishing power to the system requires careful coordination of adding system loads and generation such that operation limits of the generating equipment are not exceeded.

The general process for restoring power after an electrical power system blackout may include: 1) Isolate all power generating equipment by opening generator or line breakers at each power station. 2) Isolate the transmission system from all electric loads by opening various transmission line breakers and/or local distribution system breakers. 3) Restart a power generating unit and prepare the unit to accept load. This power station must have "black start" capability, which is the ability to start without connection to the electrical grid. 4) Close the generator breaker at the black start power station. This is known as a "dead bus" closure. 5) Energize the transmission system to nominal system voltage. 6) Connect a load block to the electrical grid by closing a local distribution substation breaker. 7) The black start power station will respond to the load demand and increase power output to match the block of load. The generating unit must be capable of increasing load to the amount equal to the load block within seconds without exceeding any operating limitations. 8) Once generation conditions have stabilized, this process may be repeated and additional segments of the local distribution system brought on line. Part of the load blocks may be used to start other power plants that do not have black start capability.

In a combined cycle power plant comprised of at least one gas turbine and at least one steam turbine, at least one gas turbine is generally used to control total power plant output by changing fuel flow in accordance with a droop governor. The steam turbine output typically follows gas turbine output as additional steam is generated from the at least one gas turbine exhaust. The steam turbine does not provide the primary response to load demand. In applying block loads to a typical combined cycle power plant the gas turbine governor would increase fuel flow as a load block is connected to the grid. Then as steam production and steam turbine output increases the gas turbine unloads to maintain total plant output at a constant level to match electrical system load.

There are a few drawbacks with the currently known methods of blocking loading. The thermal transients due to a sudden loading and subsequent unloading of the gas turbine that would occur during block loading are not desirable. Block loading can also be inhibited by other operating limitations such as, but not limiting of, combustion stability, cooling system requirements, or the like. Depending on the size of a block load power plant operating limits may be exceeded. This may result in protective actions, such as, but not limiting of aborting the attempt to restore the grid.

For the foregoing reasons, there is a need for a method and system to coordinate the block loading of a combined cycle power plant such that operating limits are not violated. The method and system should operate the power plant in such a manner to remain well within operating limits, and improve the success rate of grid restoration.

BRIEF DESCRIPTION OF THE INVENTION

In accordance with an embodiment of the present invention, a method of block loading at least one power plant, the method comprising: providing a block loading system on the at least one power plant, wherein the at least one power plant comprises at least one gas turbine, at least one steam turbine, and at least one heat recovery steam generator; determining whether at least one block loading permissive of the block loading system is satisfied; exporting power to a grid to load a first block, wherein the power is generated by the at least one power plant; determining whether at least one stabilization permissive of the block loading system is satisfied; and when required adjusting a gas turbine load control loop from a first gas turbine loading loop to a second gas loading loop; and adjusting a steam turbine load control loop from a first steam turbine loading loop to a second steam turbine loading loop; wherein the second gas turbine loading loop and the second steam turbine loading loop allow for the at least one steam turbine to provide primary speed control of the at least one power plant, when the at least one steam turbine is in use; and wherein the block loading system allows for the at least one steam turbine to primarily control the frequency while exporting power to the grid.

In accordance with an alternate embodiment of the present invention a method of block loading at least one power plant, wherein the at least one power plant comprises at least one gas turbine, at least one steam turbine, and at least one heat recovery steam generator, the method comprising providing a block loading system on the at least one power plant; wherein the block loading system allows for the at least one steam turbine to primarily control the frequency while exporting power to a grid; determining whether the power plant is exporting power to the grid; determining whether the power plant is disconnected from the grid; determining whether at least one block loading initial condition is satisfied; connecting the power plant to the grid; determining whether at least one block loading permissive of the block loading system is satisfied; exporting power to load a first block, wherein the power is generated by the at least one power plant; determining whether at least one stabilization permissive of the block loading system is satisfied; adjusting a gas turbine load control loop from a first gas turbine loading loop to a second gas turbine loading loop; and adjusting a steam turbine load control loop from a first steam turbine loading loop to a second steam turbine loading loop; wherein the second gas turbine loading loop and the second steam turbine loading loop allow for the at least one steam turbine to provide primary speed control of the at least one power plant, when the at least one steam turbine is in use; determining whether to load at least one additional block; adjusting a gas turbine load control loop from the first gas turbine loading loop to the second gas turbine loading loop; and adjusting the steam turbine load control loop from the first steam turbine loading loop to the second steam turbine loading loop; when at least one additional loaded block is loaded; exporting power generated by from the at least one power plant to load the at least one additional block if required; and after each of the additional at least one block is loaded, adjusting the gas turbine load control loop from the second gas turbine loading loop to the first gas turbine loading loop adjusting the steam turbine load control loop from second steam turbine loading loop to the first steam turbine loading loop.

In accordance with an alternate embodiment of the present invention, a system for block loading at least one power plant, wherein the at least one power plant comprises at least one gas turbine, at least one steam turbine, and at least one heat recovery steam generator, the system comprising: a block loading system on the at least one power plant; wherein the block loading system allows for the at least one steam turbine to primarily control the frequency while exporting power to a grid; means for determining whether the power plant is exporting power to the grid; means for determining whether the power plant is disconnected from the grid; means for determining whether at least one block loading initial condition is satisfied; means for connecting the power plant to the grid; means for determining whether at least one block loading permissive of the block loading system is satisfied; means for utilizing the at least one power plant to export power to load a first block; means for determining whether at least one stabilization permissive of the block loading system is satisfied; means for adjusting a gas turbine load control loop from a first gas loading loop to a second gas loading loop; and adjusting a steam turbine load control loop from a first steam loading loop to a second steam loading loop; means for determining whether to load at least one additional block; means for utilizing the at least one power plant to export power to at least one additional block if required; after each of the additional at least one block is loaded, means for adjusting the gas turbine load control loop from the second gas loading loop to the first gas loading loop adjusting the steam turbine load control loop from second steam loading loop to the first steam loading loop; and means for providing at least one notification on a status of the block loading system.

BRIEF DESCRIPTION OF THE DRAWINGS

FIG. 3, illustrate a method of coordinating block loading in accordance with an embodiment of the present invention.

DETAILED DESCRIPTION OF THE INVENTION

The following detailed description of preferred embodiments refers to the accompanying drawings, which illustrate specific embodiments of the invention. Other embodiments having different structures and operations do not depart from the scope of the present invention.

Block loading typically involves the process of restoring a grid after a blackout. A black start may be considered the process of exporting power to an electrical grid (hereinafter "grid") after a blackout, or other isolation of the power plant from the grid; as described. A black start typically commences with a dead bus breaker closure, as described.

An embodiment of the present invention takes the form of an application and process that has the technical effect of coordinating the loading of a combined cycle power plant (hereinafter "plant" or the like) during a black start grid restoration. The present invention may be applied to all forms of plants that include at least one combustion gas turbine, or the like; at least one steam turbine, or the like; and at least one heat recovery steam generator, or the like.

An embodiment of the present invention may start exporting power to the grid in small load blocks; such as, but not limiting of, from about 10 megawatts to about 40 megawatts. The present invention may initially utilize the gas turbine to provide speed control. An embodiment of the present invention may utilize the steam turbine to provide speed control when the appropriate steam conditions are available.

In an embodiment of the present invention, during block loading a speed control loop may be used to allow the at least one steam turbine to provide the power exported to additional blocks added or reconnected to the grid. The use of the at least one steam turbine for initial load pickup may allow the at least one gas turbine to be loaded more gradually using a slower gas turbine load control loop, which may minimize the gas turbines temperature transients.

In an embodiment of the present invention, once the at least one steam turbine may be prepared to generate power to at least one block load, the primary speed control of the power plant may be transferred to the at least one steam turbine. In this mode the gas turbine governor may not respond to speed changes caused by the transient block loading process.

Figure 1:
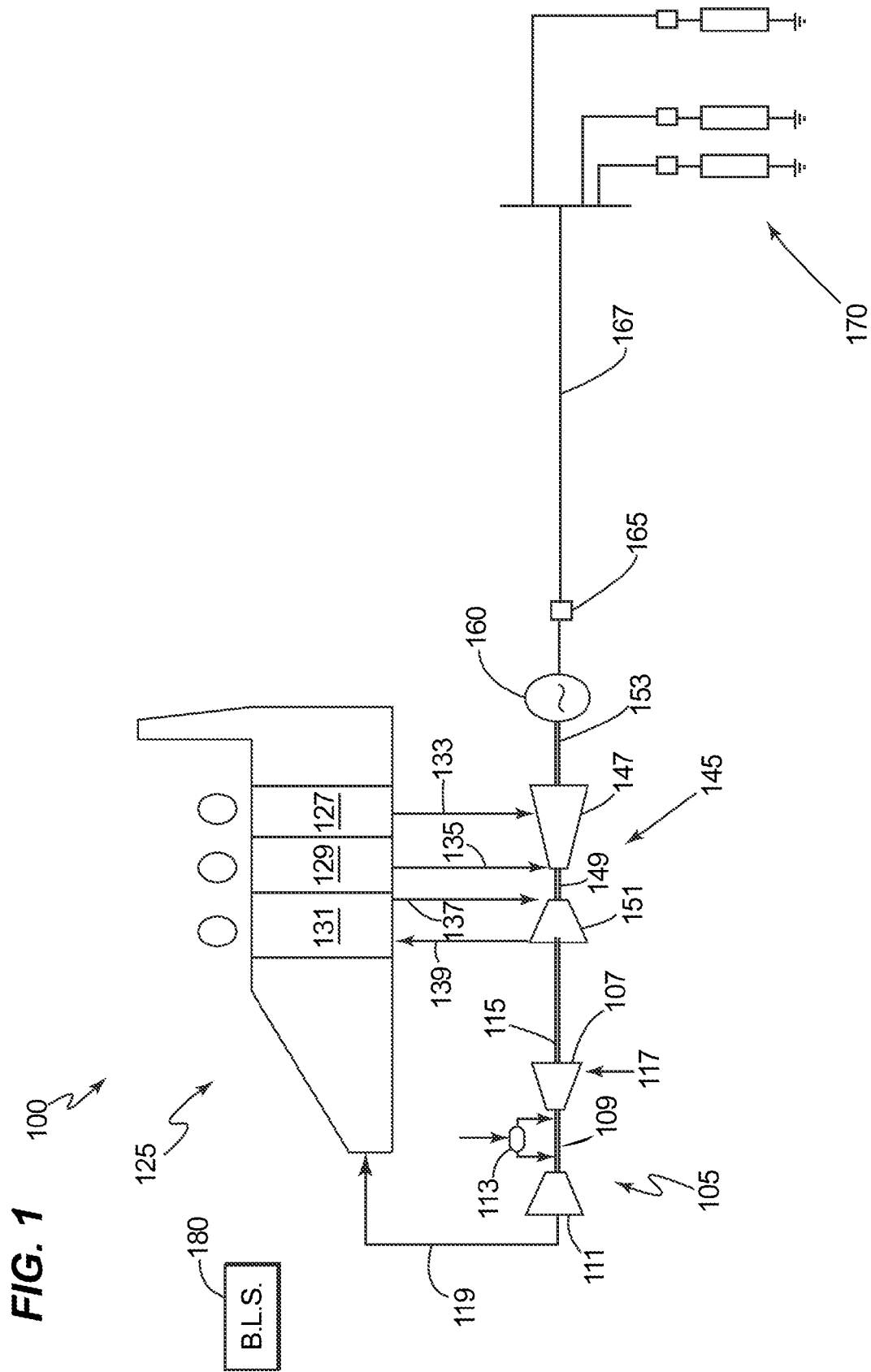
FIG. 1 is a schematic illustrating the environment in which an embodiment of the present invention operates.

Referring now to the Figures, where the various numbers represent like elements throughout the several views. FIG. 1 is a schematic illustrating the environment in which an embodiment of the present invention operates. FIG. 1 illustrates merely an overview of one type of plant 100 where an embodiment of the present invention may be used. Moreover, FIG. 1 does not illustrate all of the various components and/or auxiliaries that may be required to export power to a grid.

FIG. 1 illustrates a power plant site 100 comprising a gas turbine 105; a heat recovery steam generator (HRSG) 125; a steam turbine 145; a generator 160; and a block loading system 180, which may be incorporated into a larger plant control system (not illustrated).

The gas turbine 105 generally comprises an axial flow compressor 107 having a rotor shaft 109. Air enters the inlet of the compressor at 117, is compressed by the axial flow compressor 107 and then is discharged to a combustion system 113, where fuel such as natural gas is burned to provide high-energy combustion gases which drive the turbine 111. In the turbine 111, the energy of the hot gases is converted into work, some of which is used to drive the compressor 107 through the shaft 109, with the remainder being available for useful work to drive a load such as the generator 160 for producing electricity (hereinafter "power" or the like).

At least one steam turbine 145 may be connected to the gas turbine 105 via a tandem shaft 115. The steam turbine 145 may include an HP (high pressure) section 147 connected via a rotor 149 to an IP (intermediate pressure) or LP (low pressure) section 151. The generator 160 may be connected to the steam turbine 145 via a generator rotor 153.

The HRSG 125 may receive the exhaust 119 from the turbine 111. The HRSG 125 may include a plurality of sections including a HP section 131, an IP section 129, and an LP section 127. The HRSG 125 may allow for HP steam 137 from the HP section 131 to flow into the steam turbine 145 in the HP section 151. Similarly, IP steam 135 may flow from the HRSG 125 into the steam turbine 145 in the IP section 147. Similarly again, LP steam 133 may flow from the HRSG 125 into the steam turbine 145 in the LP section 147. A return line 139 may flow from the HP section 151 of the steam turbine 145 to the HRSG 125.

Downstream of the generator 160 may be at least one breaker 165. The breaker 165 may be used to isolate the generator 160 from the grid 170. The grid 170 may be connected to the breaker 165 via transmission lines 167.

The plant 100 may comprise at least one control system or the like (not illustrated); which may include at least one block loading system 180 for coordinating the loading of the plant 100.

Figure 2:
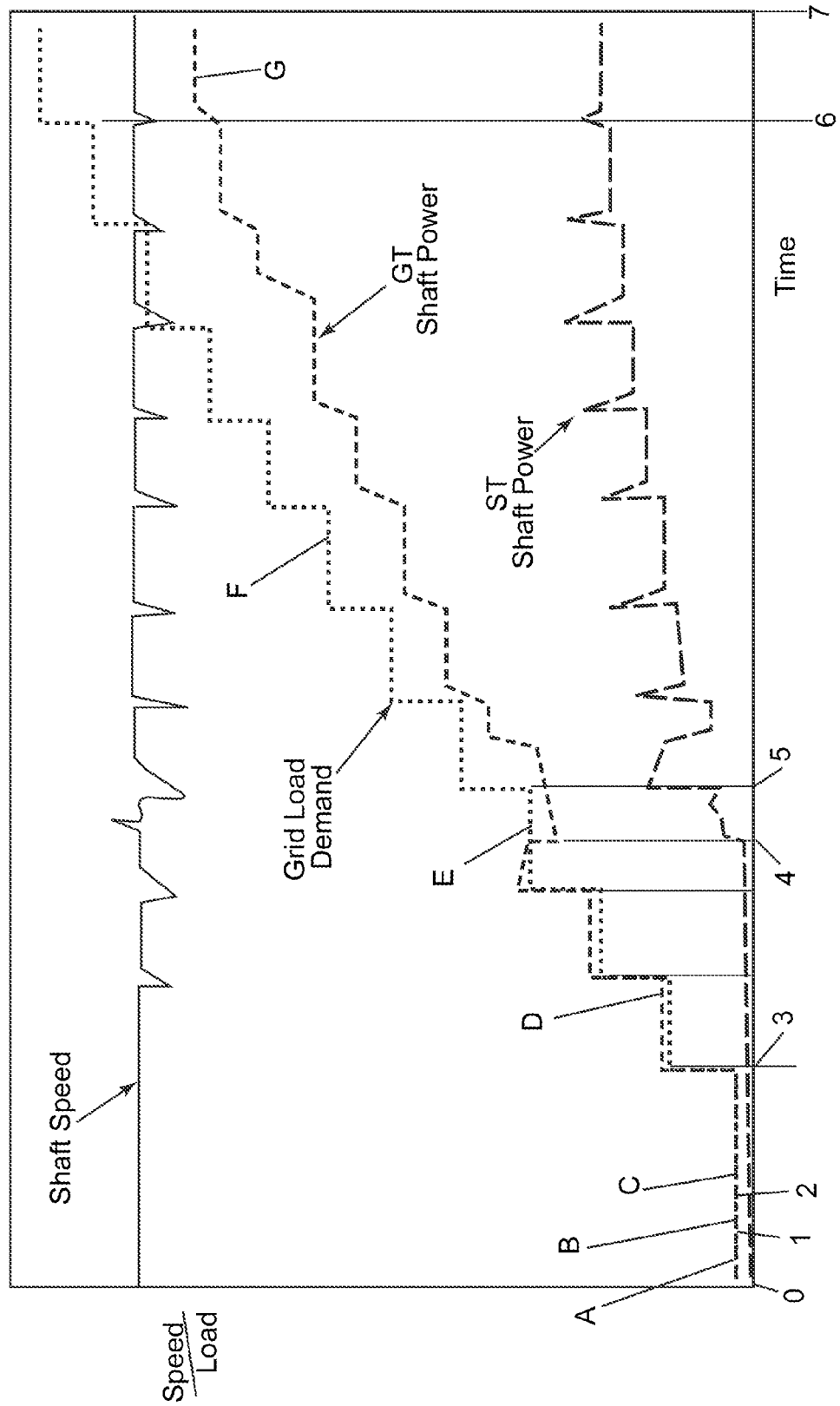
FIG. 2 is a graph illustrating the transient operation of a method of coordinating block loading in accordance with an embodiment of the present invention.

Referring now to FIG. 2, which is a graph 200 illustrating the transient operation of a method of coordinating block loading in accordance with an embodiment of the present invention. FIG. 2 illustrates the speed of the generator rotor 153 versus time. FIG. 2 also illustrates the output of the generator 160 versus the same time scale. The time range of the graph 200 covers the transient start up period, which may range from the initial start-up until the plant 100 is generating from about 75% to about 85% of load. This start up range may vary on the type and configuration of the plant 100.

FIG. 2 illustrates in graph 200 the operational sequence of the plant 100 in preparation for and execution of a block loading scenario. As illustrated in FIG. 2 the plant 100 operational sequence is denoted by a number of distinct phases, denoted alphabetically from A-G Table 1 provides an overview of the Graph 200 and specifically describes the conditions of the plant 100 during each Phase of the start-up, under an embodiment of the present invention.

TABLE 1

| Phase | Phase Description | Start Point # | End Point # |
|---|---|---|---|
| A | Gas turbine 105 operating at Full Speed No Load; breaker 165 is open. | 0 | 1 |
| B | Operator enables the block loading system 180; breaker 165 is closed. | 1 | 2 |
| C | Power is exported from the generator 160 energizes the grid 170; generator 160 operating at rated terminal voltage. | 2 | 3 |
| D | Only the gas turbine 105 exports power to pick up the first load block. | 3 | 4 |
| E | HP section 151 of steam turbine comes online, operating under inlet pressure control; gas turbine 105 load control loop rate and steam turbine 145 load control loop adjusted. | 4 | 5 |
| F | Steam turbine 145 and gas turbine 105 coordinate pick-up of additional load blocks at predetermined intervals until plant 100 reaches approximately 75% to 85% load | 5 | 6 |
| G | Plant exporting approximately 75% to 85% load; load control loops of the gas turbine 105 and the steam turbine 145 reverted to pre-block loading loops. | 6 | 7 |

An embodiment of the present invention may take the form of a software application and process that coordinates the blocking loading of the plant 100 utilizing the block loading system 180, in accordance with an embodiment of the present invention. The control system may be configured to require a user action to the initiate operation of the block loading system 180. An embodiment of the control system of the present invention may function as a stand-alone system. Alternatively, the control system may be integrated as a module, or the like, within a broader system, such as a turbine control or a plant control system.

As will be appreciated, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit", "module," or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++, or the like. However, the computer program code for carrying out operations of the present invention may also be written in conventional procedural programming languages, such as the "C" programming language, or a similar language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a public purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block The present invention may include a control system, or the like, configured to automatically or continuously monitor the grid 170 to determine whether the block loading system 180 should operate. Alternatively, the control system may be configured to require a user action to the initiate operation of the block loading system 180. An embodiment of the control system of the present invention may function as a stand-alone system. Alternatively, the control system may be integrated as a module, or the like, within a broader system, such as a turbine control or a plant control system.

Figure 3A:
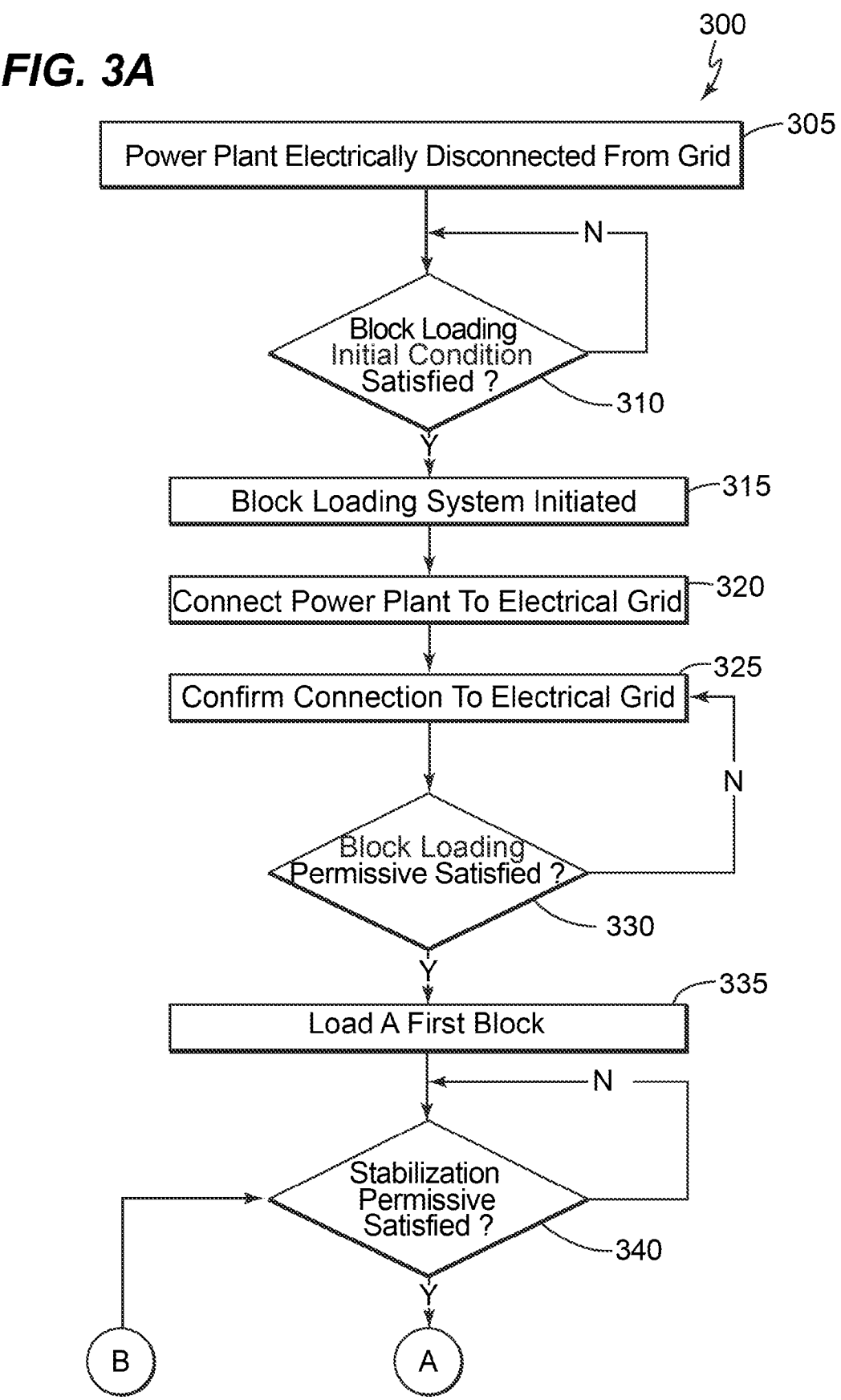
FIGS. 3A and 3B, collectively
Figure 3B:
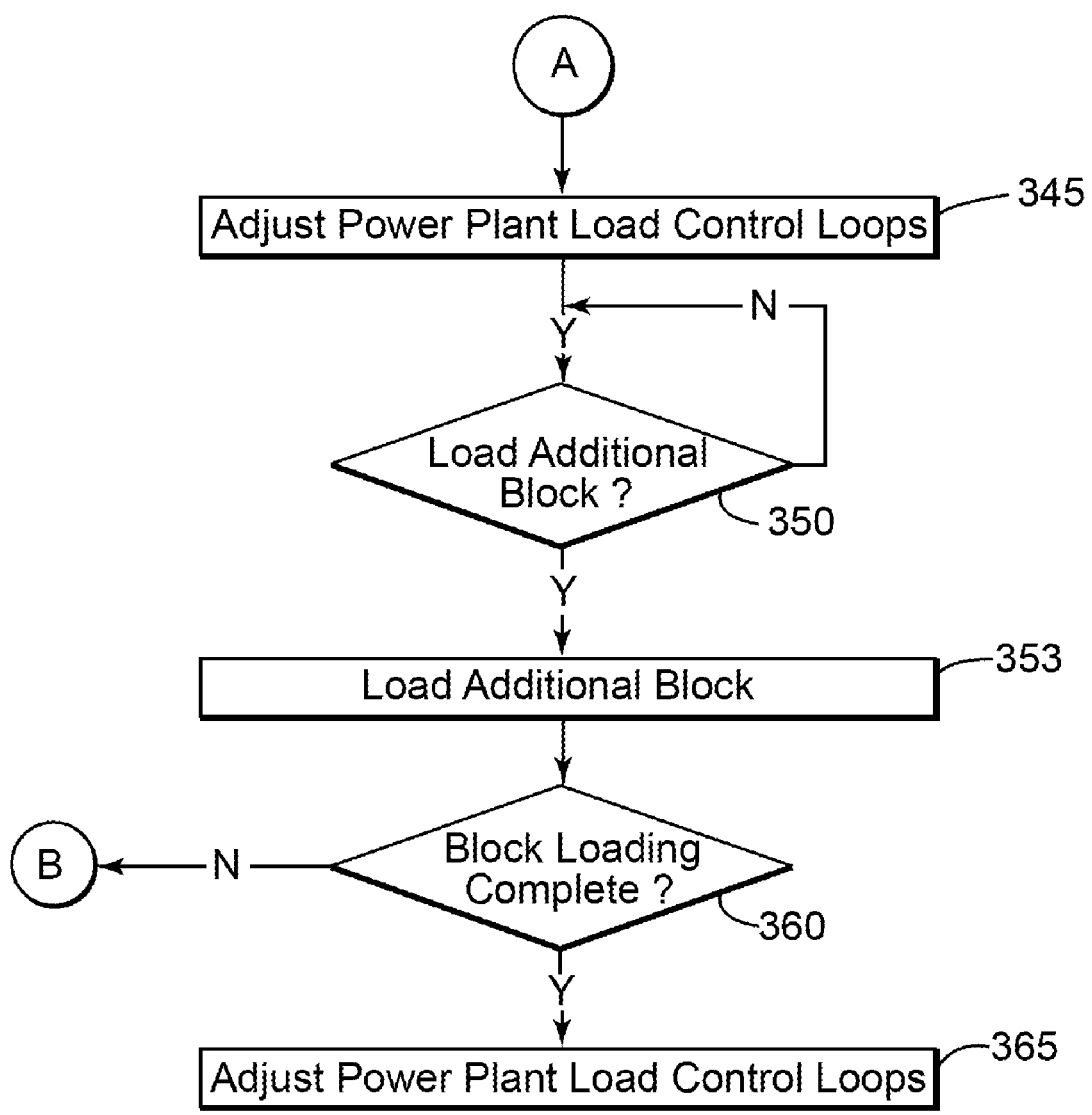

Referring now to FIGS. 3A and 3B, collectively FIG. 3, which illustrates a method of coordinating block loading utilizing the block loading system 180, in accordance with an embodiment of the present invention. In an embodiment of the present invention the block loading system 180 may provide a graphical user interface (GUI), or the like, for the operator. The GUI may allow the operator to navigate through the method 300 described below. The GUI may provide at least one notification of the status of the block loading system 180.

In step 305, the method 300 the plant 100 may be electrically disconnected from the grid 170. An embodiment of the present invention may monitor an indicator of the breaker 165 to confirm that the grid 170 may be isolated from the plant 100.

In step 310, the method 300 may determine whether at least one initial condition for blocking loading is satisfied. An embodiment of the present invention may require that at least one initial condition be satisfied before the block loading system 180. An initial condition may be generally considered an operation status that should be satisfied prior to blocking loading. For example, but not limiting of, the at least one HRSG 125 should have adequate steam to supply to the at least one steam turbine 145 prior to the block loading system 180 functioning. In an embodiment of the present invention, a user may define the initial conditions required for operation of the block loading system 180.

The at least one initial condition may comprise at least one of: a plurality of power plant auxiliaries are energized; the at least one power plant is not connected to the grid; at least one bus system is isolated from the grid; the at least one steam turbine is at an operating condition. If the at least one initial condition is satisfied then the method 300 may proceed to step 315; otherwise the method 300 may revert to step 310 until the at least one condition is satisfied.

In step 315, the block loading system 180 may be initiated. Here, the method 300, after determining that the at least one initial condition satisfied in step 310, may provide a notification that the block loading system 180 is ready for operating. For example, but not limiting of, the method 300 may provide the notification via a GUI, or the like, allowing the user to initiate the block loading system 180.

In step 320, the method 300 may request that the plant 100 be electrically connected or synchronized to the grid 170. Here, the method 300 may request that the user close the breaker 165 on the dead bus of the grid 170.

In step 325, the method 300, may confirm that the breaker 165 is closed. Here, for example, but not limiting of, the breaker 165 may provide an indicator of the open or closed position. This position may be transmitted to the block loading system 180 to confirm that the breaker 165 is closed and the plant 100 is connected to the grid 170.

In step 330, the method 300 may determine whether at least one block loading permissive may be satisfied. An embodiment of the present invention may require that at least one block loading permissive be satisfied before the block loading system 180 coordinates the exporting of the power generated by the gas turbine 105 to the first block. A block loading permissive may be generally considered a permissive used to confirm that the plant 100 and the grid 170 are prepared for block loading. For example, but not limiting of, the at least one grid 170 should have adequate loads to be energized by the power exported by the plant 100. In an embodiment of the present invention, the user may define the block loading permissives to be satisfied required for operation of the block loading system 180.

The at least one block loading permissive may include at least one of: connection to the grid 170; the first block can receive the power exported by the at least one power plant 100 for the first block load; or combinations thereof. If the at least one block loading permissive is satisfied then the method 300 may proceed to step 335; otherwise the method 300 may revert to step 325 until the at least one block loading permissive is satisfied.

In step 335, the method 300 may load the first block. In an embodiment of the present invention the gas turbine 105 may generate the power to load the first block, as discussed. Here, a user of the block loading system 180 may coordinate with an operator of the grid 170 who may indicate the size of the first block load. For example, but not limiting of, the operator of the grid 170 may inform the user of the block loading system 180 that the first load is about 25 megawatts. Next, the user of the block loading system 180 will operate the gas turbine 105 in manner to export about 25 megawatts to the grid 170.

In step 340, the method 300 may determine whether at least one stabilization permissive is satisfied. An embodiment of the present invention may require that at least one stabilization permissive be satisfied before the block loading system 180 coordinates the exporting of the power generated by both the gas turbine 105 and the steam turbine 145 to the additional block, after the first block has been loaded. The stabilization permissive may be generally considered a permissive used to confirm that the steam turbine 145 is prepared for block loading. The stabilization may help to ensure that the plant 100 and the grid 170 are in a condition ready for transferring additional power to additional loads to be connected to the grid 170. For example, but not limiting of, the at least one steam turbine 145 should have adequate steam for generating power to be exported by the plant 100. In an embodiment of the present invention, the user may define the stabilization permissives to be satisfied required for operation of the block loading system 180.

The at least one stabilization permissive may include at least one of: steam conditions of the at least one steam turbine allow for generating power; the additional load block can receive the power exported by the plant 100 and transferred via the grid 170.

If the at least one block loading permissive is satisfied then the method 300 may proceed to step 340; otherwise the method 300 may remain at step 345 until the at least one stabilization permissive is satisfied.

In step 345, the method 300, may automatically adjust the gas turbine load control loop from a first gas turbine loading loop to a second gas turbine loading loop. The first gas turbine loading loop may be considered the loop utilized by the at least one gas turbine 105 during operation in a normal or droop mode. The second gas turbine loading loop may be considered the loop utilized during the block loading. This second loop may allow for the at least one gas turbine 105 to respond slower to the addition of an additional load block in order to minimize thermal transients. This second control loop may also allow for the at least one steam turbine 145 to provide speed control for the plant 100.

In step 345, the method 300, may also automatically adjust the steam turbine load control loop from a first steam turbine loading loop to a second steam turbine loading loop. The first steam turbine loading loop may be considered the loop utilized by the at least one steam turbine 145 during operation in a normal mode. The second steam turbine loading loop may be considered the loop utilized during the block loading. This second loop may allow for the at least one steam turbine 145 to respond faster to the addition of an additional load block. This second control loop may also allow for the at least one steam turbine 145 to provide speed control for the plant 100.

In an embodiment of the present invention the block loading system 180 may automatically adjust the load control loops of the at least one gas turbine 105 and the steam turbine 145. As discussed, the block loading system 180 may adjust the load control loops to minimize the transients on the at least one gas turbine 105 associated with block loading.

In step 350, the method 300 may determine whether to load at least one additional block. An operator of the block loading system 180 may coordinate with an operator of the grid 170 to determine the amount of additional load to be added in the next block. If at least one additional load block is to be added then the method 300 may proceed to step 353; otherwise the method 300 may remain at step 350 until the an additional load block is to be added.

In step 353, the method 300 may load the at least one additional block. In an embodiment of the present invention the at least one gas turbine 105 and the at least one steam turbine 145 may generate the power to load the additional block, as discussed. Here, a user of the block loading system 180 may coordinate with an operator of the grid 170 for the timing and sequence of the loading. For example, but not limiting of, the operator of the grid 170 may inform the user of the block loading system 180 that the additional load block is about 20 megawatts. Next, the user of the block loading system 180 will operate the at least one gas turbine 105 and the at least one steam turbine 145 in manner to export about 20 megawatts to the grid 170.

In step 360, the method 300 may determine whether the block loading of the grid 170 is complete. The operator of the block loading system 180 may communicate with the operator of the grid 170 to determine whether additional loads may need to be added. If the block loading is complete then the method 300 may proceed to step 365; otherwise the method 300 may revert to step 340.

In step 365, the method 300, may automatically adjust/revert the gas turbine load control loop from the second gas turbine loading loop to a first gas turbine loading loop and may also automatically adjust the steam turbine load control loop from the second steam turbine loading loop to the first steam turbine loading loop. In an embodiment of the present invention the block loading system 180 may automatically revert the load control loops of the at least one gas turbine 105 and the steam turbine 145 to the loops used in non-black start operation, or the like.

Figure 4:
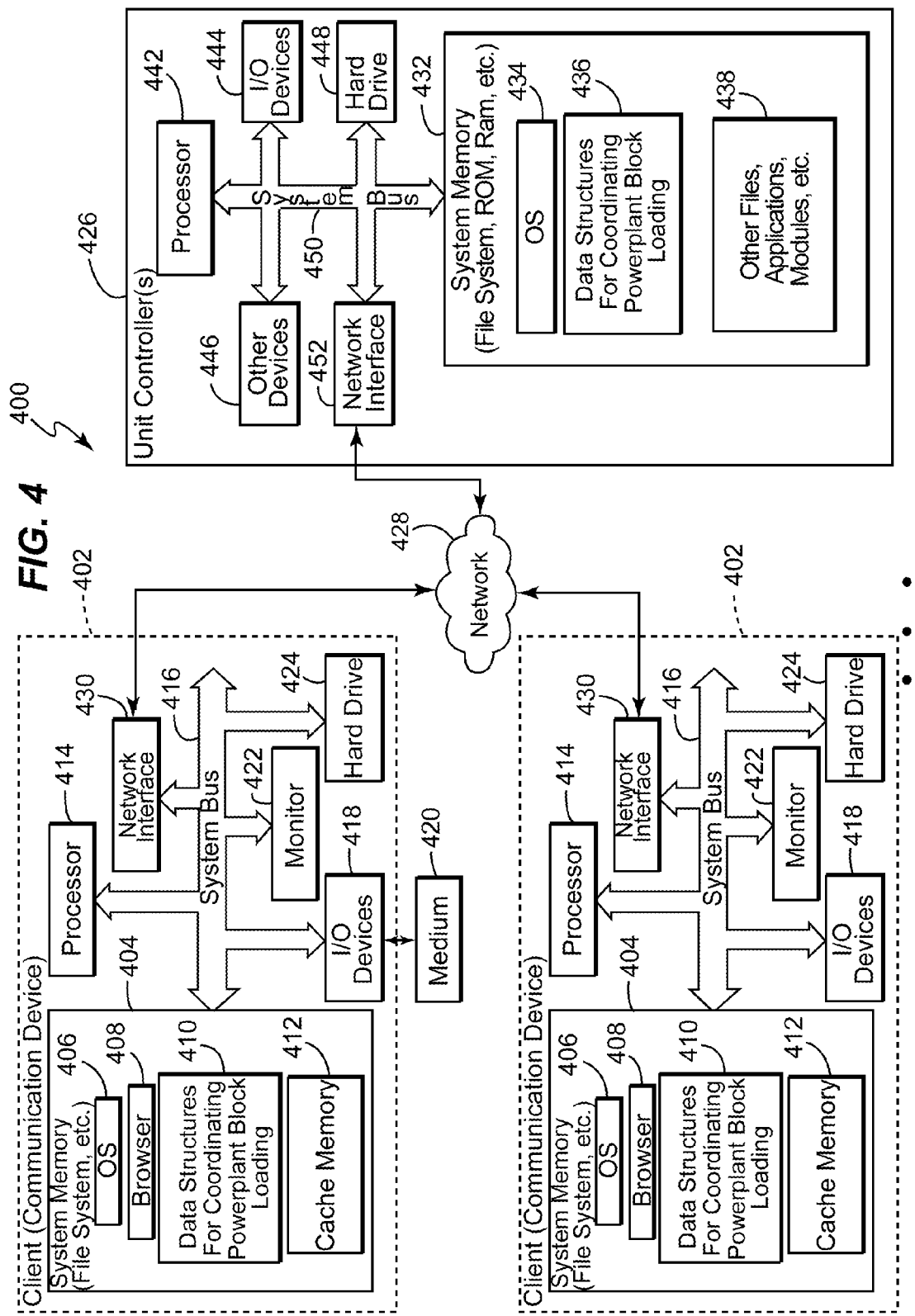
FIG. 4 is a block diagram of an exemplary system for coordinating power plant block loading in accordance with an embodiment of the present invention.

FIG. 4 is a block diagram of an exemplary system 400 for coordinating power plant block loading in accordance with an embodiment of the present invention. The elements of the method 300 may be embodied in and performed by the system 400. The system 400 may include one or more user or client communication devices 402 or similar systems or devices (two are illustrated in FIG. 4). Each communication device 402 may be for example, but not limited to, a computer system, a personal digital assistant, a cellular phone, or similar device capable of sending and receiving an electronic message.

The communication device 402 may include a system memory 404 or local file system. The system memory 404 may include for example, but is not limited to, a read only memory (ROM) and a random access memory (RAM). The ROM may include a basic input/output system (BIOS). The BIOS may contain basic routines that help to transfer information between elements or components of the communication device 402 The system memory 404 may contain an operating system 406 to control overall operation of the communication device 402. The system memory 404 may also include a browser 408 or web browser. The system memory 404 may also include data structures 410 or computer-executable code for coordinating power plant block loading that may be similar or include elements of the method 300 in FIG. 3.

The system memory 404 may further include a template cache memory 412, which may be used in conjunction with the method 300 in FIG. 3 for coordinating power plant block loading.

The communication device 402 may also include a processor or processing unit 414 to control operations of the other components of the communication device 402. The operating system 406, browser 408, and data structures 41(0 may be operable on the processing unit 414. The processing unit 414 may be coupled to the memory system 404 and other components of the communication device 402 by a system bus 416.

The communication device 402 may also include multiple input devices (I/O), output devices or combination input/output devices 418. Each input/output device 418 may be coupled to the system bus 416 by an input/output interface (not shown in FIG. 4). The input and output devices or combination I/O devices 418 permit a user to operate and interface with the communication device 402 and to control operation of the browser 408 and data structures 410 to access, operate and control the software to coordinating power plant block loading. The I/O devices 418 may include a keyboard and computer pointing device or the like to perform the operations discussed herein.

The I/O devices 418 may also include for example, but are not limited to, disk drives, optical, mechanical, magnetic, or infrared input/output devices, modems or the like. The I/O devices 418 may be used to access a storage medium 420. The medium 420 may contain, store, communicate, or transport computer-readable or computer-executable instructions or other information for use by or in connection with a system, such as the communication devices 402.

The communication device 402 may also include or be connected to other devices, such as a display or monitor 422. The monitor 422 may permit the user to interface with the communication device 402.

The communication device 402 may also include a hard drive 424. The hard drive 424 may be coupled to the system bus 416 by a hard drive interface (not shown in FIG. 4). The hard drive 424 may also form part of the local file system or system memory 404. Programs, software, and data may be transferred and exchanged between the system memory 404 and the hard drive 424 for operation of the communication device 402.

The communication device 402 may communicate with a at least one unit controller 426 and may access other servers or other communication devices similar to communication device 402 via a network 428. The system bus 416 may be coupled to the network 428 by a network interface 430. The network interface 430 may be a modem. Ethernet card, router, gateway, or the like for coupling to the network 428. The coupling may be a wired or wireless connection. The network 428 may be the Internet, private network, an intranet, or the like.

The at least one unit controller 426 may also include a system memory 432 that may include a file system, ROM, RAM, and the like. The system memory 432 may include an operating system 434 similar to operating system 406 in communication devices 402. The system memory 432 may also include data structures 436 for coordinating power plant block loading. The data structures 436 may include operations similar to those described with respect to the method 300 for coordinating power plant block loading. The server system memory 432 may also include other files 438, applications, modules, and the like.

The at least one unit controller 426 may also include a processor 442 or a processing unit to control operation of other devices in the at least one unit controller 426. The at least one unit controller 426 may also include I/O device 444. The I/O devices 444 may be similar to I/O devices 418 of communication devices 402. The at least one unit controller 426 may further include other devices 446, such as a monitor or the like to provide an interface along with the I/O devices 444 to the at least one unit controller 426. The at least one unit controller 426 may also include a hard disk drive 448. A system bus 450 may connect the different components of the at least one unit controller 426. A network interface 452 may couple the at least one unit controller 426 to the network 428 via the system bus 450.

The flowcharts and step diagrams in the figures illustrate the architecture, functionality, and operation of possible implementations of systems, methods, and computer program products according to various embodiments of the present invention. In this regard, each step in the flowchart or step diagrams may represent a module, segment, or portion of code, which comprises one or more executable instructions for implementing the specified logical function(s). It should also be noted that, in some alternative implementations, the functions noted in the step may occur out of the order noted in the figures. For example, two steps shown in succession may, in fact, be executed substantially concurrently, or the steps may sometimes be executed in the reverse order, depending upon the functionality involved. It will also be noted that each step of the step diagrams and/or flowchart illustration, and combinations of steps in the step diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, it should be appreciated that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method of block loading at least one power plant, the method comprising:
providing a block loading system on at least one power plant, wherein the at least one power plant comprises at least one gas turbine, at least one steam turbine, and at least one heat recovery steam generator;
determining whether the at least one power plant is in a black start condition, wherein the at least one power plant is electrically disconnected from a grid;
determining whether at least one block loading permissive of the block loading system is satisfied;
exporting power to the grid to load a first block, wherein the power is generated by the at least one power plant;
determining whether at least one stabilization permissive of the block loading system is satisfied; and
automatically adjusting a gas turbine load control loop from a first gas turbine loading loop to a second gas turbine loading loop; and automatically adjusting a steam turbine load control loop from a first steam turbine loading loop to a second steam turbine loading loop; wherein the second gas turbine loading loop and the second steam turbine loading loop allow for the at least one steam turbine to provide primary speed control of the at least one power plant, when the at least one steam turbine is in use; and
wherein the block loading system allows for the at least one steam turbine to primarily control the frequency while exporting power to the grid.

2. The method of claim 1 further comprising:
determining whether the power plant is exporting power to a grid;
determining whether the power plant is disconnected from the grid;
determining whether at least one block loading initial condition is satisfied; and
connecting the power plant to the grid.

3. The method of claim 2 further comprising:
determining whether to load at least one additional block;
adjusting a gas turbine load control loop from the first gas turbine loading loop to the second gas turbine loading loop; and adjusting the steam turbine load control loop from the first steam turbine loading loop to the second steam turbine loading loop; when at least one additional block of load is added;

exporting power generated by from the at least one power plant to load the at least one additional block if required; and after each of the additional at least one block is loaded, adjusting the gas turbine load control loop from the second gas turbine loading loop to the first gas turbine loading loop adjusting the steam turbine load control loop from second steam turbine loading loop to the first steam turbine loading loop.

4. The method of claim 2 wherein the step of determining whether the at least one block loading initial condition is satisfied; the at least one block loading initial condition comprises at least one of: a plurality of power plant auxiliaries are energized; the at least one power plant is not connected to the grid; at least one bus system is isolated from the grid; the at least one steam turbine is at an operating condition.

5. The method of claim 1 wherein the step of exporting the power to load the first block comprises the at least one gas turbine generating the power.

6. The method of claim 1 wherein the step of determining whether the at least one block loading permissive is satisfied; the at least one block loading permissive comprises at least one of: connection to a grid; the first block can receive the power exported by the at least one power plant; or combinations thereof.

7. The method of claim 1 wherein the step of determining whether the at least one stabilization permissive of the block loading system is satisfied; the at least one stabilization permissive comprising at least one of: steam conditions of the at least one steam turbine allows for generating power; the at least one additional block can receive the power exported by the at least one power plant.

8. The method of claim of claim 1 wherein the block may comprise at least 10 to 40 megawatts.

9. The method of claim 1, wherein after the step of exporting power to load the first block; the at least one steam turbine exports power to initially load at least one additional block; and the at least one gas turbine exports power to subsequently load the at least one additional block.

10. The method of claim 1 further comprising: providing at least one notification on a status of the block loading system.

11. A method of block loading at least one power plant, wherein the at least one power plant comprises at least one gas turbine, at least one steam turbine, and at least one heat recovery steam generator, the method comprising:

providing a block loading system on at least one power plant; wherein the block loading system allows for the at least one steam turbine to primarily control the frequency while exporting power to the grid;

determining whether the at least one power plant is in a black start condition, wherein the at least one power plant is electrically disconnected from the grid;

determining whether the power plant is exporting power to the grid;

determining whether the power plant is disconnected from the grid;

determining whether at least one block loading initial condition is satisfied;

connecting the power plant to the grid;

determining whether at least one block loading permissive of the block loading system is satisfied;

exporting power to load a first block, wherein the power is generated by the at least one power plant;

determining whether at least one stabilization permissive of the block loading system is satisfied;

automatically adjusting a gas turbine load control loop from a first gas turbine loading loop to a second gas turbine loading loop; and automatically adjusting a steam turbine load control loop from a first steam turbine loading loop to a second steam turbine loading loop; wherein the second gas turbine loading loop and the second steam turbine loading loop allow for the at least one steam turbine to provide primary speed control of the at least one power plant, when the at least one steam turbine is in use;

determining whether to load at least one additional block;

automatically adjusting a gas turbine load control loop from the first gas turbine loading loop to the second gas turbine loading loop; and automatically adjusting the steam turbine load control loop from the first steam turbine loading loop to the second steam turbine loading loop; when at least one additional loaded block is loaded;

exporting power generated by from the at least one power plant to load the at least one additional block if required; and after each of the additional at least one block is loaded, automatically adjusting the gas turbine load control loop from the second gas turbine loading loop to the first gas turbine loading loop; automatically adjusting the steam turbine load control loop from second steam turbine loading loop to the first steam turbine loading loop.

12. The method of claim 11, wherein the step of exporting the power to load the first block comprises the at least one gas turbine generating the power.

13. The method of claim 11, wherein the step of determining whether the at least one block loading initial condition is satisfied; the at least one block loading initial condition comprising at least one of:

a plurality of power plant auxiliaries are energized; the at least one power plant is not connected to the grid; at least one bus system is isolated from the grid; the at least one steam turbine is at an operating condition.

14. The method of claim 11, wherein the step of determining whether the at least one block loading permissive is satisfied; the at least one block loading permissive comprising: at least one of: connection to a grid; the first block can receive the power exported by the at least one power plant; or combinations thereof 15. The method of claim 11, wherein the step of determining whether the at least one stabilization permissive of the block loading system is satisfied; the at least one stabilization permissive comprising at least one of: steam conditions of the at least one steam turbine allows for generating power; the at least one additional block can receive the power exported by the at least one power plant.

16. The method of claim of claim 11, wherein the block may comprise 10 to 40 megawatts.

17. The method of claim 11, wherein after the step of exporting power to load the first block; the at least one steam turbine exports power to initially load at least one additional block; and the at least one gas turbine exports power to subsequently load the at least one additional block.

18. A system for block loading at least one power plant, wherein the at least one power plant comprises at least one gas turbine, at least one steam turbine, and at least one heat recovery steam generator, the system comprising:

a block loading system on the at least one power plant; wherein the block loading system allows for the at least one steam turbine to primarily control the frequency while exporting power to a grid;

means for determining whether the power plant is exporting power to the grid;

means for determining whether the power plant is disconnected from the grid;

means for determining whether at least one block loading initial condition is satisfied;

means for connecting the power plant to the grid;

means for determining whether at least one block loading permissive of the block loading system is satisfied;

means for utilizing the at least one power plant to export power to load a first block;

means for determining whether at least one stabilization permissive of the block loading system is satisfied;

means for automatically adjusting a gas turbine load control loop from a first gas loading loop to a second gas loading loop; and means for automatically adjusting a steam turbine load control loop from a first steam loading loop to a second steam loading loop;

means for determining whether to load at least one additional block;

means for utilizing the at least one power plant to export power to at least one additional block if required;

after each of the additional at least one block is loaded, means for automatically adjusting the gas turbine load control loop from the second gas loading loop to the first gas loading loop; and means for automatically adjusting the steam turbine load control loop from second steam loading loop to the first steam loading loop; and means for providing at least one notification on a status of the block loading system.

19. The system of claim 18, wherein the at least one block loading initial condition comprises: at least one of:

a plurality of power plant auxiliaries are energized; the at least one power plant is not connected to the grid; at least one bus system is isolated from the grid; the at least one steam turbine is at an operating condition; wherein the at least one block loading permissive comprises: at least one of: connection to a grid; the first block can receive the power exported by the at least one power plant; or combinations thereof; and wherein the at least one stabilization permissive comprises at least one of: steam conditions of the at least one steam turbine allows for generating power; the at least one additional block can receive the power exported by the at least one power plant.

20. The system of claim 18, wherein the at least one gas turbine generates the power for exporting to load the first block; and wherein the at least one steam turbine exports power to initially load at least one additional block; and the at least one gas turbine exports power to subsequently load the at least one additional block.

* * * * *